Nov. 27, 1923.

A. C. HARTMAN

TIMER

Filed Sept. 7, 1923 2 Sheets-Sheet 1

A. C. HARTMAN

By Arthur H. Sturges,
Attorney

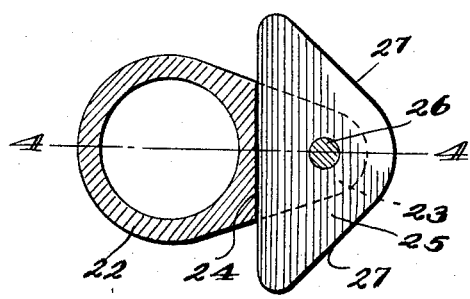
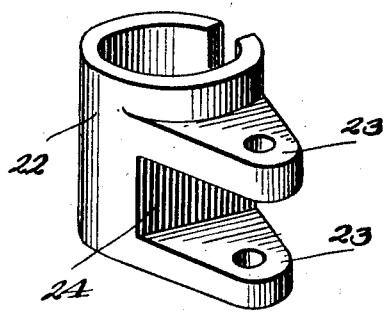
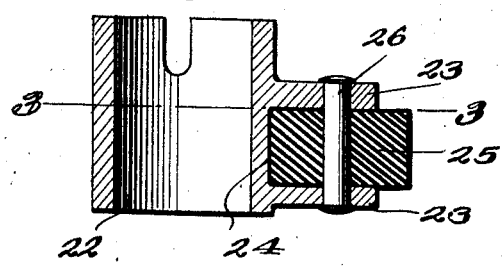
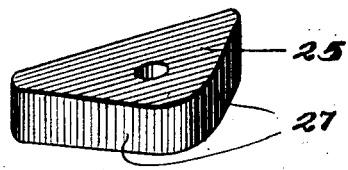
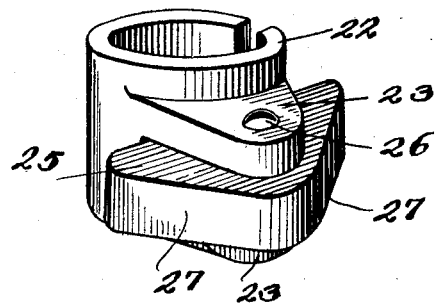

Patented Nov. 27, 1923.

1,475,820

UNITED STATES PATENT OFFICE.

ARTHUR C. HARTMAN, OF OMAHA, NEBRASKA, ASSIGNOR TO OMAHA ACCESSORY COMPANY, OF OMAHA, NEBRASKA, A CORPORATION OF NEBRASKA.

TIMER.

Application filed September 7, 1923. Serial No. 661,403.

*To all whom it may concern:*

Be it known that I, ARTHUR C. HARTMAN, a citizen of the United States, residing at Omaha, in the county of Douglas and State of Nebraska, have invented certain new and useful Improvements in Timers, of which the following is a specification.

The present invention relates to timers or commutators for use on internal combustion engines, and has for an object to provide an approved and efficient timer for use particularly on Ford engines.

An object of the invention is to provide a timer which has a revolving arm with a non-rotatable contact piece in its end shaped and constructed to engage spring members for moving together pairs of contacts to close the desired circuits in proper sequence during the rotation of the arm, and to thus eliminate rollers and other such contrivances which have movement and which are subjected to continual wear not only at their contact surfaces but also at their point of support.

A further object of the invention is to provide a timer of this character wherein the contact points are yieldingly brought together and maintained in a clean condition to prevent corrosion thereof and accumulations between the points which offer resistance and prevent closing of the circuit.

Another object of the invention is to provide a timer of this construction which is adapted particularly for application to Ford engines without alteration of the standard parts thereof and with the substitution of but relatively few parts.

The invention further aims at the provision of a timer which promotes continuously better sparking in the cylinders, which will not require lubrication and which will be free of the disadvantages incident to the use of oil, such as the deterioration of the insulation and other parts and the swelling of the parts incident to saturation.

A further and improved object of the invention is to provide a contact piece on the outer end of the rotary arm which will wear indefinitely and will not get out of order or require substitution and which is so shaped and mounted as not to require turning.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a rear elevation of a timer constructed according to the present invention, the timer shaft of the engine being shown in section.

Figure 3 is a transverse section taken substantially on the line 3—3 of Figure 4 and through the timer arm showing the mounting of the wiper in the outer end of the arm.

Figure 4 is a similar section taken at right angles to the showing in Figure 3 and substantially on the line 4—4 of Figure 3.

Figure 5 is a detail perspective view of the rotating arm.

Figure 6 is a detail perspective view of the wiper removed from the arm, and

Figure 7 is a detail perspective view of the rotating arm with the wiper mounted therein.

Figure 1:
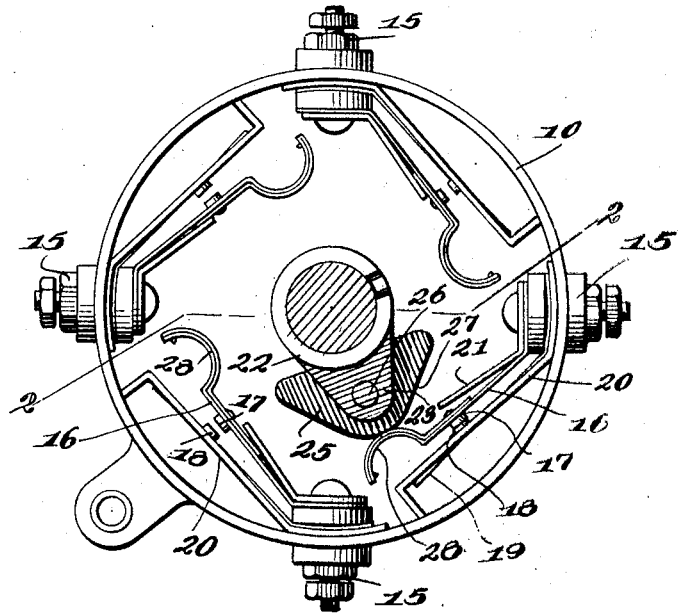

Referring to the drawing 10, designates the casing of the timer which is of the usual construction and which at its inner end is substantially cylindrical while its outer end is closed and tapers to conical form and is provided at its apex with the usual depression 11 for receiving and holding the spring arm 12 which is a part of the Ford engine structure.

Figure 2:
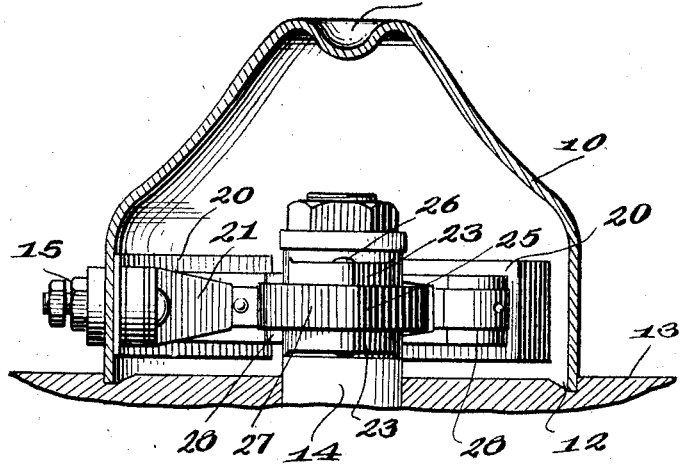
Figure 2 is a transverse section taken through the same substantially on the line 2—2 of Figure 1 and showing the timer as applied to the front end of the engine.

In Figure 2 the casing 10 is shown as seated in the usual groove 12 of the crank case 13 of the engine, and the crank case thus closes the inner side of the casing and forms a bearing against which the casing 10 may turn. It will be noted that the groove 12 is formed concentric to the timer shaft 14 and that the latter projects into the casing 10. In the case of a four cylinder engine, the casing 10 is provided with four binding posts 15 which project radially inward through the casing 10 and which are connected at their inner ends to spring arms 16 carrying contact points 17 arranged to engage and wipe over similar contact points 18 mounted on spring tongues 19 so that the contact points may move outwardly together with one wiping across the face of the other to retain the same clean when the spring arms 16 are forced outwardly.

The means for making the contacts 17 and 18 consecutively close throughout the circular series of contacts, is a rotating arm 22 in the form of a sleeve which fits the timer shaft 14 of the engine and which has at one side a pair of longitudinally spaced apart ears 23 and a relatively flat tangential surface 24 lying between the ears 23. The ears 23 are adapted to support a wiper 25 which may be formed from a rubber composition or the like and which is of triangular shape.

The hypotenuse side of the wiper 25 is adapted to engage across the flat face 24 of the rotary arm as shown to advantage in Figures 1 and 3, the ears 23 and the wiper 25 are provided with openings therethrough adapted to register and receive a rivet or pin 26 therethrough to permanently connect the wiper to the arm. The flat inner edge of the wiper is adapted to engage the flat surface 24 of the arm so that the wiper cannot turn about the pin 26. The opposite flaring outer edges of the wiper 25 provide cam surfaces 27 adapted to engage the spring arms 16 at their outer ends to depress the arms and hold them depressed until the nose of the wiper passes beyond the spring arms. The free ends of the spring arms 16 are provided with inwardly bowed portions 28 adapted to receive the wiper 25 thereagainst after the wiper has passed over the contacts 17 and 18, and so that the rotating arm may be relatively short. The nose or apex of the wiper 25 is rounded on a relatively large radius as shown in the drawings so as to maintain the contacts 17 and 18 in closed position for an appreciable period of time during the turning of the arm 22.

The operation of the device is apparent, for when the timer shaft 14 is rotated, the arm 22 is carried therewith and the wiper 25 is brought into engagement with the ends 28 of the spring arms so as to depress the spring arms toward the casing 10 and first bring the contacts 17 and 18 together. As the arm 22 further advances, the spring arm 16 is further depressed and such action causes the contacts 17 and 18 to wipe against one another and flex the spring tongue 19. The spring tongue 19 acts to absorb the shock or jar upon the contacts and other parts thereabout and also insures a substantially uniform pressure between the contacts when they are closed.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. A timer for internal combustion engines comprising a casing adapted to be mounted in an engine about the exposed end of the timer shaft, a rotary arm in the casing for connection with said timer shaft and having spaced outstanding ears on its end and a bearing face lying between the ears, and a wiper fitting between the ears and having a complemental bearing face adapted to engage said face of the rotary arm for holding the wiper from turning between the ears, and a circular series of contacts arranged within the casing in the path of said wiper and adapted to be consecutively closed thereby during the rotation of the arm.

2. A timer for internal combustion engines comprising a rotatable casing, a circular series of contacts arranged in pairs within the casing, a rotating arm in the casing adapted for connection with the timer shaft of the engine, a wiper block fitted in the outer end of the arm for consecutively engaging said contacts to close the same, said wiper having an inner flat edge and said arm having an outer flat face adapted to receive said edge of the wiper thereagainst for holding the wiper from turning and rocking during rotation of said arm.

3. A timer for internal combustion engines comprising a casing adapted to be mounted on an engine about the exposed end of the timer shaft, a rotary arm in the casing for connection with said timer shaft and having longitudinally spaced ears in the outer end thereof and a flat tangential face lying between the ears, and a wiper of triangular construction fitting between the ears with a flat side engaging said face for holding the wiper from turning between the ears, and a circular series of contacts arranged within the casing in the path of said wiper and adapted to be consecutively closed thereby during the rotation of the arm.

4. A timer for internal combustion engines comprising a rotatable casing adapted to be placed about the timer shaft of the engine, an arm in the casing for connection to said shaft, a triangular wiper mounted in the outer end of the arm and having outwardly converging contact faces and a round nose at the apex, pairs of spring members arranged in a circular row in the casing adapted to be traversed by said wiper, the inner spring members having inwardly bowed free ends adapted to engage said converging edges of the wiper for compressing the spring members together, and contacts carried by the spring members.

In testimony whereof, I have affixed my signature in presence of two witnesses.

ARTHUR C. HARTMAN.

Witnesses:
ARTHUR H. STURGES,
CLARA M. JAYCOX.